D. PEASE, Jr.
Buckwheat Cleaner.
No. 6,289.
Patented April 10, 1849.
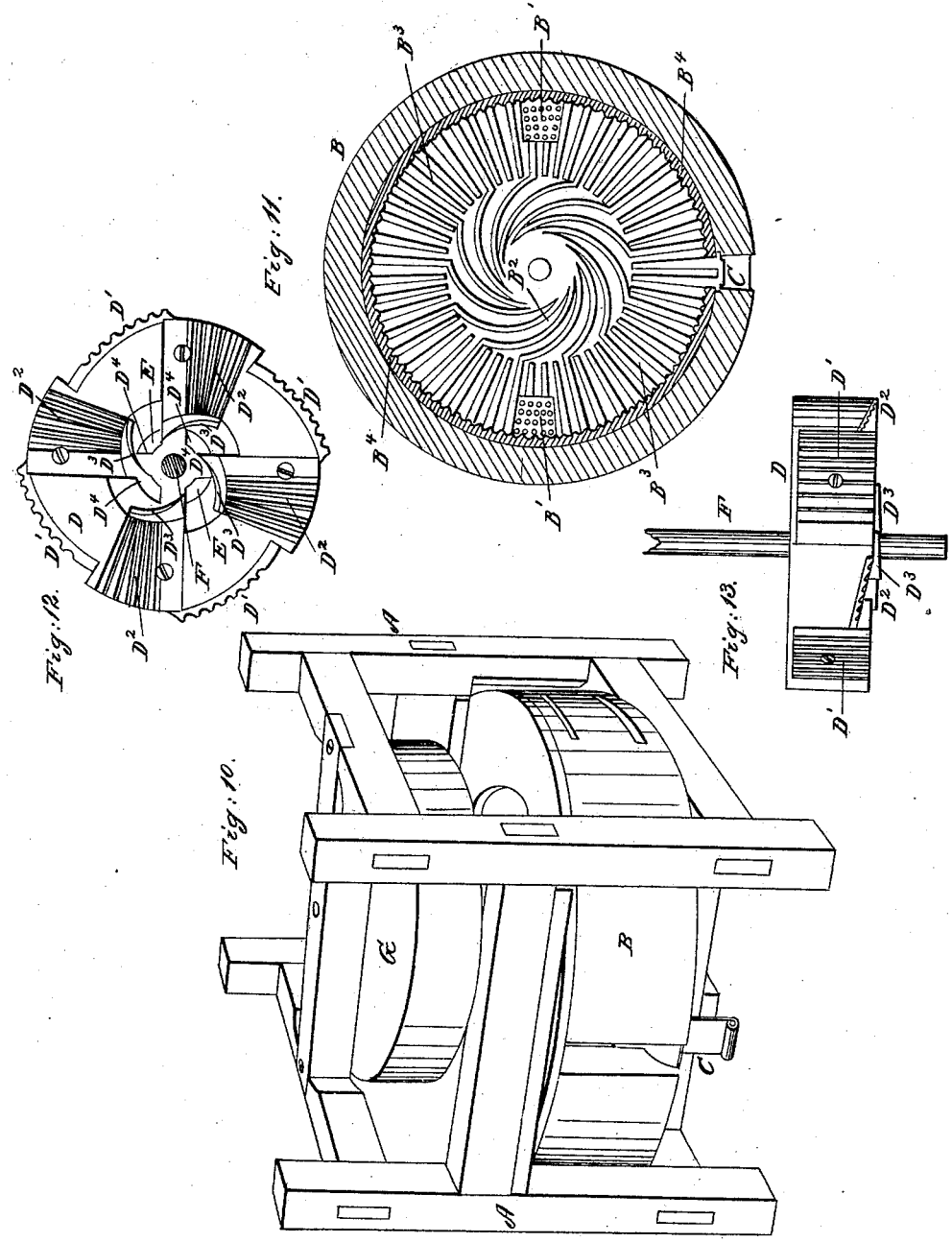

UNITED STATES PATENT OFFICE.

DAN PEASE, JR., OF FLOYD, NEW YORK.

HULLING-MACHINE.

Specification of Letters Patent No. 6,289, dated April 10, 1849.

*To all whom it may concern:*

Be it known that I, DAN PEASE, Jr., of the town of Floyd, in the county of Oneida and State of New York, have invented certain improvements on my patented machine for cleaning buckwheat, for which Letters Patent were granted to me on the 14th day of July, 1846, which improvements are described as follows, reference being had to the annexed drawings of the same, making part of this specification, of which—

Figure 10 is a perspective view of a modification of my machine. Fig. 11 is a plan of the bottom and sides of the stationary cylinder in which the rubbing takes place. Fig. 12 is a view of the under side of the revolving cylinder, or rubber that burns in the stationary cylinder. Fig. 13 is a view of the side of ditto.

Similar letters in the different figures refer to corresponding parts.

A represents the frame made of suitable size and strength for the purpose intended.

B is the stationary cylinder in which the rubbing of the buckwheat is performed.

B′ are the openings in the bottom covered with perforated plates through which the dust and dirt escape, when rubbed from the buckwheat.

$B^2$ are the segment ribs arranged around the center of the bottom of the cylinder against which the buckwheat is forced by the wedge like rubbers of the revolving cylinder.

$B^3$ are the radial ribs of the bottom of the cylinder which start from the ends of the segment ribs and continue to the periphery of the circle, against which the aforesaid wedge like rubbers force the grain, and between which the rubbing operation takes place.

$B^4$ are the parallel vertical ribs around the inside of the stationary cylinder and parallel with the axis of the same, against which ribs the grain is forced by the wedge like rubbers on the periphery of the cylinder, and between which and the cylinder B the grain is rubbed as it rises in the cylinder B by raising the regulating slide C to increase or diminish the rubbing process, it being increased by raising the slide and decreased by lowering it.

D is the revolving cylinder.

D′ are the ribbed wedge like rubbers for rubbing the grain against the inside of the cylinder B.

$D^2$ are the radial wedge like rubbers for rubbing the grain against the bottom of the cylinder B.

$D^3$ are the spiral wings to force the grain outward from the center of the cylinder to hold it while under the action of the radial and spiral rubbers.

$D^4$ are radial arms that connect the cylinder to the shaft.

E is the eye of the cylinder through which the grain is fed.

F is the shaft of the cylinder.

G is the pulley around which a band from the propelling power is applied, to put the machine in operation.

The manner in which this machine operates on the buckwheat is described as follows: The machine being put in motion by any adequate power the buckwheat to be cleaned is introduced to the eye of the revolving cylinder D and is first met by the curved wings $D^3$ and driven by them under the radial wedge formed rubbeds $D^2$, where it is rubbed against the spiral and radial ribs $B^2$ $B^3$ of the bed; and when it reaches the inner periphery of the hollow cylinder, or ribbed curb, the rubbing operation is continued by the wedge formed rubbers D on the periphery of the cylinder and then falls over the upper edge of the regulating slide C and passes off through a spout of a common winnowing machine. As the radial wedge formed rubbers $D^2$ pass over the grain it is pressed down upon the stationary ribs which arrests a portion of it, the remainder being carried forward and around by the wedge formed rubbers, thus dividing the mass of grain leaving one part and carrying the other part around and being at the same time under heavy pressure, thus causing the friction on the grain, to be regulated by the regulating slide—which is raised or lowered as may be desired—the raising of the slide increasing the pressure and thereby the friction—the contrary effect being produced by lowering it. The dust passes out through the perforations B′ B′.

What I claim as my invention and desire to secure by Letters Patent, is—

1. The combination of the radial wedge formed rubbers $D^2$ and segment wings $D^3$ on the lower end of the cylinder D arranged and operating in the manner and for the purpose herein set forth.

2. I claim constructing the horizontal bed plate of the stationary cylinder with curved segment ribs around the center of the bed plate in combination with the radial ribs, arranged and operating in the manner and for the purpose set forth.

In testimony whereof I have hereunto signed my name before two subscribing witnesses this 13th day of September, A. D. 1847.

DAN PEASE, JR.

Witnesses:
WM. P. ELLIOTT,
R. PECK.